Figure 1:
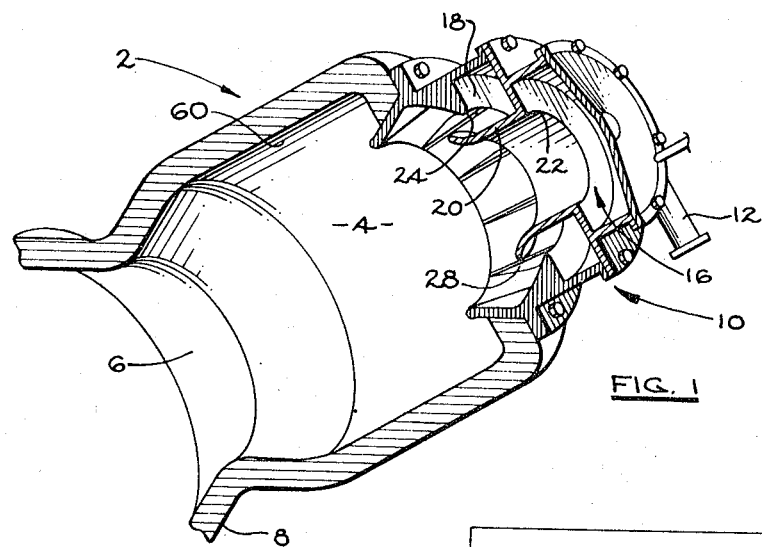

March 12, 1968   D. I. BAKER   3,372,543
THROTTLING INJECTOR
Original Filed Oct. 5, 1964

INVENTOR.
DWIGHT I. BAKER
BY
Donald W. Graves
ATTORNEY 3,372,543
THROTTLING INJECTOR
Dwight I. Baker, Woodland Hills, Calif., assignor to
North American Aviation, Inc.
Continuation of application Ser. No. 402,064, Oct. 5,
1964. This application June 17, 1966, Ser. No. 558,549
6 Claims. (Cl. 60—39.74)

This application is a continuation of application Ser. No. 402,064, filed Oct. 5, 1964, now abandoned.

This invention relates to thrust combustion devices.

More particularly, this invention relates to a throttling injector for a gas combustion device.

In the field of gas combustion devices and in particular the area of rocket engines, there exists a need for an effective throttling injector to enable the gas combustion device or rocket engine to be throttled down over wide ranges. For liquid engines, it has been possible in the past to throttle down to 50 percent of full rated thrust by providing propellant valves upstream of the injector face. For throttling ranges below this, any attempt to use these throttling valves results in combustion instability due to the large pressure drop across the valves. The only manner or way of overcoming this is to provide extremely high pressure tanks or pumps upstream of the fuel and oxidizer valves. This is impractical since it is desirable to have the lowest pressure possible upstream of the valves while enabling full throttling ranges. It is necessary to provide a large enough pressure drop across the injector face to obviate the problems of combustion instability. Many attempts have been made to provide throttling mechanisms and are summarized as follows.

One manner in which throttling over a 10:1 ratio, i.e., throttling down to 10 percent of full rated thrust can be accomplished is to provide a variable area pintle injector such as disclosed in U.S. application Ser. No. 166,452, now Patent No. 3,234,731 assigned to the assignee of this invention. However, while this injector has proved effective and is utilized in engines currently being developed, several disadvantages manifest themselves. The first disadvantage resides in the necessity for a rather complicated movable pintle with comparatively many moving parts including bellows, seals and poppet mechanism. Another disadvantage resides in the chance of hot spots occurring at the injector face particularly in the area of the pintle.

Another method for throttling to 10 percent of rated thrust or lower is to provide an inert gas which aids in preventing high frequency combustion stability. Such a method and structure is disclosed in U.S. application Ser. No. 242,240 assigned to the assignee of this invention.

Another method of throttling involving momentum exchange is disclosed in U.S. application Ser. No. 258,373 assigned to the assignee of this invention.

Both of the above throttling methods and structure, while effective, have certain disadvantages which are obviated by the features of this invention. For example, the necessity for introducing an inert gas necessitates the carrying aboard of the rocket engine vehicle, a supply of this inert gas. In addition, additional valves and orifices are necessary. The throttling injector discussed in U.S. application Ser. No. 258,373 also has the disadvantage of the necessity for a plurality of valves as well as the use of multiple manifolds which adds in complexity, weight, and therefore, cost.

Another disadvantage resides in almost every injector configuration now used whether throttlable or not. Practically every liquid rocket engine utilizes a large number of small orifices in the injector face through which the propellant is introduced for mixing and ultimate combustion in the combustion chamber. This presents an additional problem to those enumerated above due to the necessity for drilling many accurate orifices. Not only is the difficulty pronounced in this drilling procedure, but in addition the engine during use suffers the possible disability of having orifices plugged or blocked by impurities in the propellant or for other reasons.

The instant invention provides for a throttling injector which obviates many of these disadvantages. All orifices are eliminated and each of the fuel and oxidizer or a monopropellant, if such is used, are each introduced individually through one line to one opening to the chamber. A simple valve is utilized across which the pressure drop occurs. However, this valve is in the combustion chamber and a kinetic velocity is imparted to the propellants whereby they swirl around the respective chambers, spill over a lip and impinge on baffles simultaneously to aid in mixing, and, therefore, to promote combustion. In addition, the baffles tend to dampen transverse modes of combustion to aid in combustion stability. The arrangement is a very simple one and it merely requires propellant lines, a valve for each propellant used, a swirl chamber, a spill lip and a baffle arrangement.

An object of this invention is to provide an improved throttling injector for gas combustion devices and the like.

Figure 2:
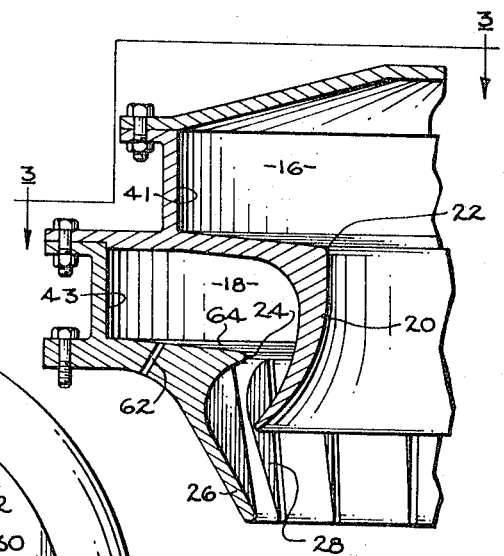
Figure 3:
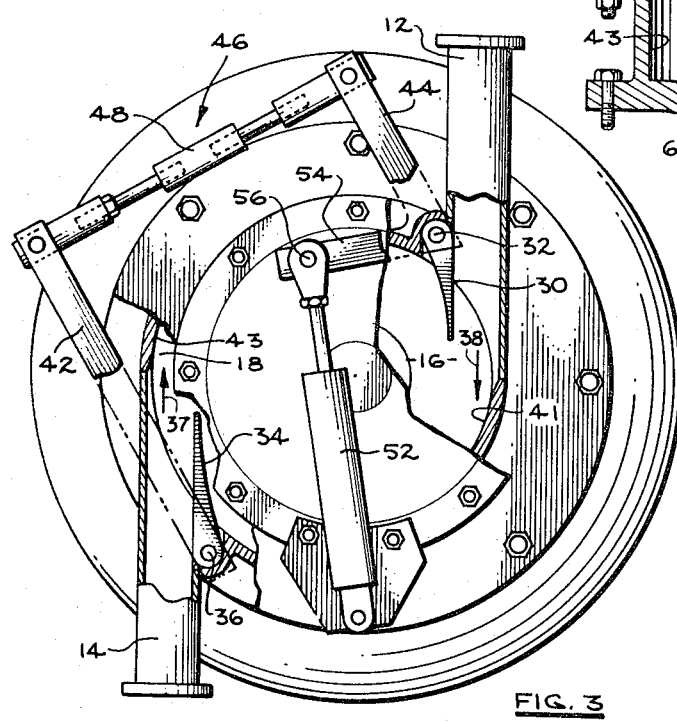

Other objects and advantages of this invention will become apparent as this description proceeds taken in conjunction with the drawings in which:

FIG. 1 is a perspective view partially in cross-section of an engine and throttling injector according to this invention with the valves and linkage not shown for purposes of clarity, FIG. 2 is a detail view in cross-section of the injector, and FIG. 3 is a top view partially in cross-section of the throttling injector taken across the lines 3—3 of FIG. 2 and illustrates the linkage for the valves.

Referring to FIG. 1, a gas combustion device which is shown as a rocket engine is illustrated at 2. The rocket engine includes a combustion chamber 4, a throat region 6 and the nozzle portion 8 which is partially broken away. This is the so-called conventional ell or De Laval nozzle. Indicated generally at 10 is the injector according to this invention. Propellant enters lines 12 and 14 (see FIG. 3). Line 12 leads into chamber 16 which preferably is the oxidizer chamber. Line 14 leads into chamber 18 which is preferably the fuel chamber.

A splash plate or lip 20 separates the fuel and oxidizer when the oxidizer spills over lip 22 and the fuel spills over lip 24 (see FIG. 2). An annular plate or lip 26 is formed as part of the injector assembly and has located on it a plurality of baffles 28.

As shown in FIG. 3, a flapper valve 30 is located between line 12 and chamber 16. This valve is hinged at 32 so that valve 30 may vary the inlet opening between line 12 and chamber 16 to throttle the amount of oxidizer in chamber 16 and hence combustion chamber 4. Similarly, valve 34 hinged at 36 is located between fuel line 14 and chamber 18. Both valves 30 and 34 act as throttling valves. Fuel entering chamber 18 and oxidizer entering chamber 16 are introduced tangentially into the respective chambers as indicated by arrows 37 and 38. This results in a swirling action.

In operation, oxidizer entering line 12 passes through valve 30, enters chamber 16 and swirls around the chamber against wall 41 in a circumferential direction. As the chamber fills inwardly toward lip 22, the oxidizer will pass over the lip and due to its circumferential velocity, will travel down the interior of splash plate 20 and then outwardly toward lip 26. When the oxidizer contacts lip 26, the baffles 28 will impede the circumferential progress of the oxidizer causing the oxidizer to break into minute droplets to aid in combustion. Similarly, fuel entering line 14 will pass through valve 34 and into chamber 18 against wall 43 and as in the case of the oxidizer, will fill chamber 18 until the lip 24 is reached at which time the fuel will pass over the lip, pass radially outwardly toward lip 26 and likewise impinge on baffles 28. When the liquid propellants simultaneously impinge on these baffles, an intimate mixing occurs and either by the use of an igniter, not shown, or by providing hypergolic propellants, combustion occurs and is carried on primarily in combustion chamber 4 to produce gas under high pressure. This gas then passes through throat area 6 at sonic velocity and heads into nozzle 8 where it is expanded to produce usable thrust. Any transverse modes of combustion tend to be suppressed by baffles 28.

Flapper valve 34 is pivoted about pin 36 as is arm 42 to which valve 34 is rigidly attached. Arm 42 is connected to arm 44 by means of adustable linkage 46. Adjustable linkage 46 is shown as being of the turn-buckle type so that rotation of element 48 will cause arms 42 and 44 to move toward or away from each other. Arm 44 by means of pin 32 is connected to flapper valve 30. An actuator 52 which is shown as being of the hydraulic type is pivoted to arm 54 through pin 56. Arm 54 is rigidly attached to arm 44 about pin 32. Thus, extension of the hydraulic actuator serves to rotate valve 34 and valve 30 to a more open position. Retraction of the actuator closes valves 32 and 34. By moving arms 44 and 42 toward or away from each other through adjustable linkage 46, the mixture ratio can be varied at will.

To aid in cooling or minimizing heat transfer to wall 60, apertures 62 are provided in wall 64 of chamber 18. This allows fuel (or oxidizer if desired) to pass through the aperture and, due to the fuel having a radial velocity component, impinge on wall 60. This causes a cooling effect on the nozzle and combustion chamber walls by lowering the heat transfer rate from the hot gases in the combustion chamber to the walls.

To throttle the engine, it is a simple matter to manipulate valves 30 and 34 toward a closed position by means of actuator 52. Since the chamber pressure will drop due to less propellant being introduced into the combustion chamber, and the upstream pressure remains relatively constant, it can be seen that the pressure drop actually increases across the throttling valves. This has the effect of increasing the velocity of the fuel and oxidizer so that at low thrust levels, the intimate mixing of the propellants is facilitated, thus maintaining and increasing performance. Also, combustion instability, a problem so present in the past is obviated.

The advantages of the instant device over the prior art examples are many. One advantage resides in the elimination of the many orifices necessary in the majority of prior art examples. Instead, one throttable inlet to each fuel and oxidizer chamber is provided which allows the use of single lines for each propellant. Another advantage of the instant device over several of the throttable injectors disclosed in the prior art resides in the elimination of moving parts in the combustion chamber itself. At substantially all times, for example, valves 34 and 30 are exposed to the relatively cool propellant so that hot spots are avoided. At the same time, the upstream pressure drop which occurs in prior art examples utilizing simple valves in the propellant lines, is eliminated since the pressure drop occurs across the valve and is transferred to a velocity rather than a pressure head. In addition, the instant invention contains only two moving parts in the engine, namely, the valves 30 and 34. Another advantage resides in the imparting to the propellants a velocity so that upon impinging on the baffles and splash plates, intimate mixing of the propellants occurs obviating the problem of combustion instability. In addition, any propellant which spills over lip 26 will be forced toward the combustion chamber and nozzle wall to aid in cooling of the wall.

While I have described my invention in detail in its one preferred embodiment, it is obvious particularly to those skilled in the art after understanding my invention that various changes and modifications can be made therein without departing from the spirit and the scope of the appended claims.

I claim:
1. A device for supplying fluid to a gas producing chamber comprising:
   an injector,
   means forming a first annular chamber in the injector, said chamber having a fluid inlet,
   first lip means connected to and extending radially inward of said first chamber,
   a first fluid line terminating in a section connected to and aligned tangentially with said first chamber,
   first throttling means including a flapper valve positioned between said first chamber and said first fluid line section for varying the size of the opening of said chamber fluid inlet,
   a second annular chamber formed with a fluid inlet, said second chamber being concentric with and adjacent to said first annular chamber,
   second lip means connected to and extending radially inwardly of said second chamber,
   a second fluid line terminating in a section connected to and aligned tangentially with said second chamber,
   second throttling means including a flapper valve positioned between said second chamber and said second fluid line section for varying the size of the opening of said second chamber fluid inlet,
   interconnecting means for interconnecting said flapper valves,
   actuator means linked to said interconnecting means for simultaneously varying the sizes of the openings of the fluid inlets,
   means for passing fluid through said first throttling means into said first chamber where under swirling action the fluid flows over said first lip means and,
   means for passing fluid through said second throttling means into said second chamber where under swirling action the fluid flows over said second lip means and mixes and combusts with the fluid flowing over said first lip means in said gas producing chamber.

2. The device according to claim 1 wherein an adjustment linkage is connected to said interconnecting means for enlarging one of said fluid inlets relative to the other and further comprising:
   a bell crank attached to one of said flapper valves and connected to said actuator means,
   an arm connected to the other of said flapper valves, said bell crank and arm being interconnected by said adjustable linkage whereby actuation of said actuator means causes simultaneous enlargement or constriction of the openings in said fluid inlets.

3. An injector for a gas producing device having a combustion chamber comprising:
   an annular manifold,
   means adapted to supply liquid propellant with a velocity head tangentially in said manifold,
   lip means radially inward of said manifold whereby when said manifold is filled with propellant, excess propellant will pass over said lip means and into said combustion chamber,
   baffle means in said combustion chamber adapted to intercept said propellant whereby said propellant impinges on said baffle means after passing said lip means.

4. An injector as set forth in claim 3 further comprising:
   a second annular manifold,
   means adapted to supply a second liquid propellant with a velocity head tangentially into said second manifold, second lip means radially inward of said second manifold whereby when said second manifold is filled with said second propellant, excess propellant will pass over said second lip means and into said combustion chamber.

5. An injector as set forth in claim 4 wherein the baffles are substantially radial.

6. An injector as set forth in claim 4 wherein valve means are provided to vary the rate of flow of propellant to each of said manifolds.

References Cited

UNITED STATES PATENTS 2,944,786  7/1960  Angell _____ 253—55
3,169,368  2/1965  Munding _____ 60—39.66

RALPH D. BLAKESLEE, *Primary Examiner.*